United States Patent [19]

Richards

[11] 4,287,506

[45] Sep. 1, 1981

[54] VOLTAGE GENERATOR WITH SELF-CONTAINED PERFORMANCE MONITOR

[75] Inventor: Gerald P. Richards, Framingham, Mass.

[73] Assignee: Raytheon Company, Lexington, Mass.

[21] Appl. No.: 972,311

[22] Filed: Dec. 22, 1978

[51] Int. Cl.³ .......................... H01J 29/56; H04N 9/24
[52] U.S. Cl. .............................. 340/146.3 R; 315/370; 340/724; 358/67
[58] Field of Search ............... 340/741, 742, 812, 813, 340/736, 724, 660, 661, 146.3 R, 805, 734; 358/67, 242, 243; 315/370, 398, 395

[56] References Cited

U.S. PATENT DOCUMENTS

| | | | |
|---|---|---|---|
| 3,488,483 | 1/1970 | Freedman | 340/741 |
| 3,510,669 | 5/1970 | Peraza | 315/370 |
| 3,911,360 | 10/1975 | Kimzey | 340/661 |
| 3,944,737 | 3/1976 | Drax et al. | 315/370 |
| 3,976,991 | 8/1976 | Hickin et al. | 340/742 |
| 4,016,362 | 4/1977 | Bristow et al. | 340/724 |
| 4,027,148 | 5/1977 | Rosenthal | 340/741 |
| 4,099,092 | 7/1978 | Bristow | 315/370 |
| 4,159,484 | 6/1979 | Strathman | 358/67 |
| 4,160,981 | 7/1979 | Raney, Jr. | 340/724 |

*Primary Examiner*—Leo H. Boudreau
*Attorney, Agent, or Firm*—Vincenzo D. Pitruzzella; Joseph D. Pannone; Milton D. Bartlett

[57] ABSTRACT

A system for the generation of a set of voltages, such as the X and Y coordinate voltages of a display or automated milling machine, includes a character generator and a character positioning circuit which, in turn, are responsive to digital control signals as are produced by a computer. A detector compares detection signals to reference signals at successive instants during the use of the system. The computer utilizes a learning routine in conjunction with voltage generation circuitry to develop the reference signals. The computer is programmed to provide specific values of the digital control signals at the times of the comparisons by the detector to detect any deviation of the magnitudes of the voltages of the deflection circuitry from the magnitudes attained during an initial alignment of the system.

13 Claims, 4 Drawing Figures

VOLTAGE GENERATOR WITH SELF-CONTAINED PERFORMANCE MONITOR

The invention herein described was made in the course of or under a contract or subcontract thereunder, with the Department of the Navy.

BACKGROUND OF THE INVENTION

This invention relates to systems for the generation of voltages such as deflection voltage generators in displays configured to be controlled by digital signals and, more particularly, to the monitoring of the performance of the voltage generation.

An exemplary voltage generator is found in one form of a display utilizing a cathode ray tube (CRT) for displaying symbols and patterns at various locations on the face of the display. The voltage generator includes a character generator and X-Y position voltage circuitry. The symbols and patterns are conveniently generated by means of a character generator wherein a selected symbol is produced in response to a digital control signal. The position of the displayed symbol is set by a pair of digital-to-analog converters which convert digital signals representing the X and the Y coordinates to analog voltages which are applied to the CRT deflection circuitry. Signals produced by the character generator are combined with the coordinate signals at the input to the deflection circuitry so that the symbols are thereby positioned on the display. In many applications, such displays are utilized to present output data from a computer in which case the computer provides the digital control signals for designating the specific symbols and their locations on the display.

In the foregoing display system, it is seen that a set of voltages is generated in response to a digital control signal. Similarly, in automated milling machinery and other industrial processors, a preprogrammed set of analog voltages is produced in response to a digital control signal.

Analog currents may be produced instead of the analog voltages. For example, deflection circuitry frequently utilizes analog signals, such as analog currents, to drive a pair of deflection coils for directing the electron beam of the CRT.

A problem arises in that such deflection circuitry and automated process control circuitry is subject to drift depending on the length of time that the circuitry is in operation. To correct for the drifting, in display deflection circuitry, attempts have been made to monitor the signals applied by the deflection circuits to the deflection coils, in the case of magnetic deflection, or to the deflection plates in the case of electrostatic deflection. However, such attempts have utilized equipment which is unduly complicated in that it requires the use of much additional circuitry not normally found in displays.

SUMMARY OF THE INVENTION

The foregoing problem is overcome and other advantages are provided by a performance monitoring system which, in accordance with the invention, utilizes circuitry already present in a display or automated process control for providing a sequence of test signals at successive instants during the operation of the display. To facilitate the explanation of the invention, the following description will be presented with reference to a display, it being understood that a similar description applies to other process control circuitry. The system, incorporated into a display, further includes a source of reference signals and a detection circuit for detecting the magnitudes of signals of the deflection circuit relative to the reference signals to indicate conformance of the signal magnitudes to such values as are established during initial alignment of the display.

In a preferred embodiment of the invention, the performance monitoring system has been integrated with a CRT display incorporating magnetic deflection circuitry utilizing signals having an analog format. The signals produced by the deflection circuitry are a composite of signals produced by a character generator, and coordinate position signals for the X and Y axes. During each performance monitoring operation, the computer orders such coordinate position signals which are smaller than those utilized during the initial alignment by an amount equal to one-half the dimension of a character provided by the character generator. During each performance monitoring operation, the magnitudes of the deflection signals of the deflection circuit are compared to the reference signals throughout the generation of the aforementioned character. The selected character, which is preferably a single stroke symbol, such as a vector directed in a generally radial direction outward from the center of the display, provides for a resultant set of deflection signals which have amplitudes which vary from a value less than that of a corresponding reference signal to a value greater than that of the corresponding reference signal. The detection circuit is, therefore, in the form of a crossing detector which detects that a value of deflection signal has crossed over the threshhold value of the reference signal. The detection circuit is readily implemented in a preferred embodiment of the invention by a set of flip-flops and exclusive OR circuits. The foregoing procedure monitors any drift in the values of the X and the Y components of the deflection signals.

Once the X and the Y components of the deflection signals have been verified as being free of drift, the character generator can then be checked to ascertain whether there may be drift in its signals. To perform a test of the character generator signals, the computer provides coordinate signals in accordance with a test program wherein the values of the coordinate signals are reduced from the corresponding values at the initial alignment of the display, the reduction in amplitude being equal to the desired amplitude of a character. Thereupon, the detection circuit signals the attainment of the desired value of the corresponding deflection signal to show a correct amplitude for the character component of the deflection signal.

Other signals of the display may also be monitored. For example, the voltages of power supplies may be applied via attenuators to the detection circuit with suitable reference signals being applied via one of the analog-to-digital converters during a test mode in the operation of the display. Such testing may be accomplished during sufficiently short intervals of time such that the testing may be interleaved with the displaying of data so as to go unnoticed by an observer of the display. The selection of the reference signals can be provided by the aforementioned converter and is accomplished in accordance with a test program applied to the computer.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
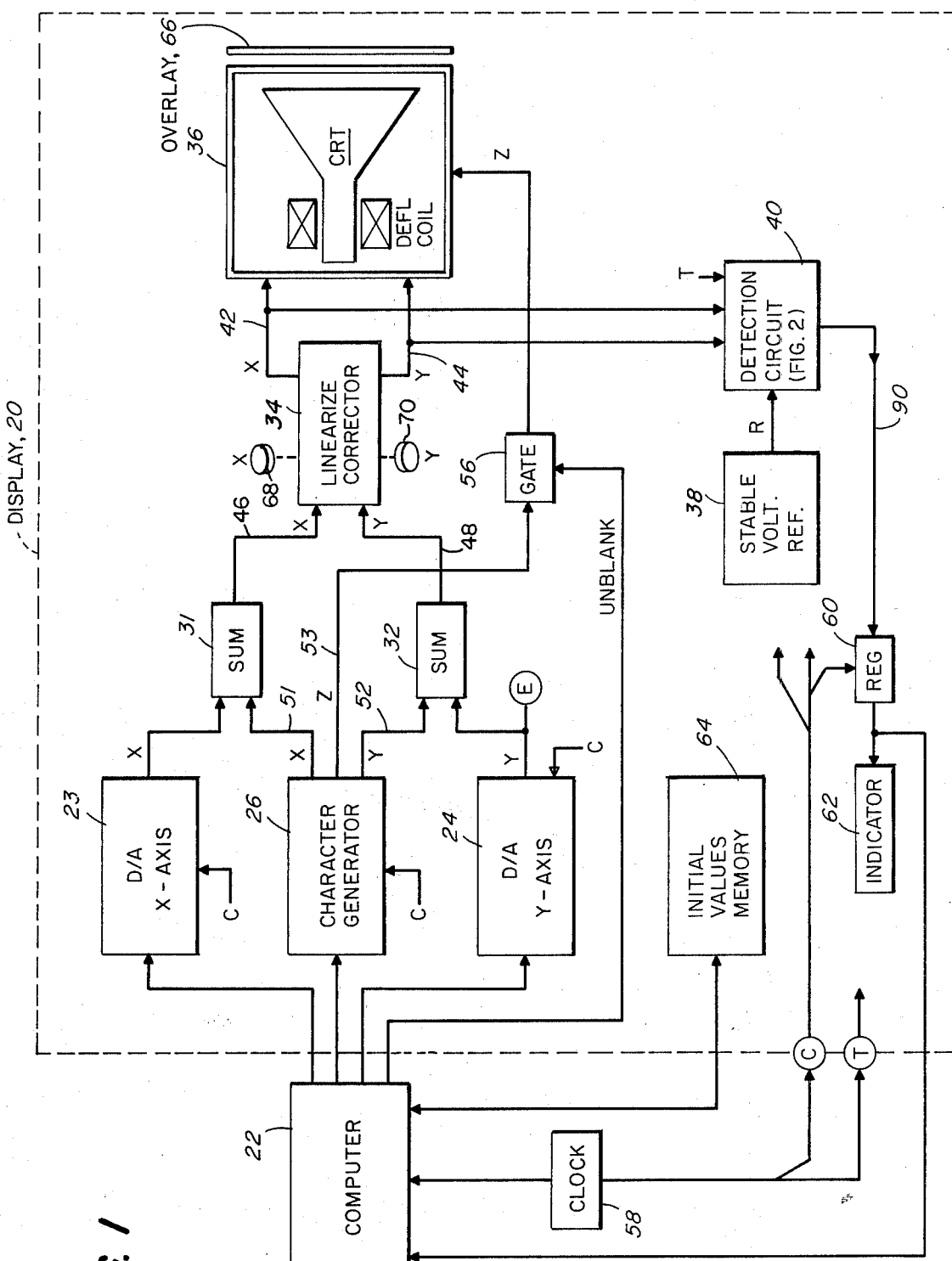
FIG. 1 is a block diagram of a display driven by a computer and having components thereof being connected for monitoring by the performance monitoring system of the invention.

Referring now to FIG. 1, there is seen a display 20 coupled to a computer 22. The display comprises two digital-to-analog converters 23 and 24, a character generator 26, two summers 31–32, a linearization corrector 34 and a CRT 36. The display 20 also includes a stable voltage reference source 38 and a detection circuit 40 for monitoring the performance of the display 20. The CRT 36 employs, by way of example, magnetic deflection of the electron beam, one set of deflection coils being activated by the X axis signal on line 42 while the second set of deflection coils is activated by the Y axis signal on line 44. The X and Y signals appearing on lines 46 and 48 are linear in X and Y and provide the correct value of deflection for a circular face of a CRT. The invention is equally applicable to both a spherical face and a planar face of the CRT. In view of the general use of planar faces for display purposes, the corrector 34 is employed for reducing distortion, such as pincushion distortion. The corrector 34 adjusts the amplitudes of the signals on the lines 46 and 48 to provide corresponding values on lines 42 and 44 for a linear deflection on the planar face of the CRT 36.

The display 20 is driven by the computer 22, the computer 22 designating a sequence of patterns or symbols or characters to be generated by the character generator 26 for presentation on the CRT 36. In addition, the computer 22 designates the X and the Y coordinate positions of the symbols appearing on the face of the CRT 36. Digital signals representing the X and the Y coordinate values are applied via the computer 22 to the converters 23 and 24, respectively, which then convert the digital signals to analog signals. In addition, the computer applies a digital address to the generator 26 for identifying a specific symbol and the magnitude thereof. The generator 26 then produces a sequence of signals having X, Y and Z components which are applied via the lines 51, 52 and 53 respectively to the CRT 36. The Z axis signal on line 53 is coupled via a gate 56 to the CRT 36 for modulating the Z axis signal thereof. The signal on line 51 is summed with the signal of the converter 23 by the summer 31 to produce the X axis signal on line 46. The signal on line 52 is summed with the signal of the converter 24 by the summer 32 to produce the Y axis signal on line 48. The operation of the computer 22 and the components of the display 20 are synchronized by a clock 58, the clock 58 applying clock pulses via terminals C and T of the display 20 to the respective components of the display 20. Also included in the display 20 are a register 60, an indicator 62 and a memory 64 for use with the detection circuit 40 in monitoring the performance of the display 20.

In operation, the display 20 is initially aligned for producing a pattern of points on the face of the CRT 36 and located at various distances and directions from the center of the CRT 36. The points of the pattern are to be placed in alignment with an overlay 66 as will be described subsequent reference to FIG. 3. The initial values of the X and Y coordinates of the pattern points are stored in the memory 64. Fine adjustment of the X and Y values is accomplished by gain control knobs 68 and 70 on the corrector 34, the knobs 68 and 70 providing for a fine alignment of the pattern points with the overlay 66.

In addition to providing the aforementioned X and Y coordinates of the test points during the alignment procedure, specific values of $+X$, $-X$, $+Y$ and $-Y$, which are stored in the memory 64, are provided on lines 46 and 48 to produce deflection signals on the lines 42 and 44 which closely match corresponding reference voltages of the source 38. A perfect match is generally not obtained because of the manual adjustment by the knob 68 and 70. Accordingly, the computer 22 "learns", or determines, the values of the coordinate signals which match the reference voltages by the use of a measurement program of "halving of the uncertainty region" which is well known to those skilled in numeric computer programming techniques. The measurement of the specific test values will be described hereinafter with reference to FIG. 2. A good match results in an indication on the indicator 62 that the manual alignment of the pattern with the overlay 66 is acceptable, while a poor match produces a warning indication on the indicator 62. After the computer 22 has obtained the corrected values of the coordinate signals on lines 46 and 48 which produce an equality between the deflection signals on lines 42 and 44 and the reference voltages of the source 38, the corrected values of the coordinate signals are entered into the memory 64 for use in subsequent monitoring of any drift which might occur in the magnitude of the foregoing deflection signals.

The memory 64 also stores the designation of characters to be displayed during the monitoring operations. During intervals between the displaying of data on the CRT 36, the computer 22 addresses the memory 64 to obtain the values of the X and the Y positioning coordinates and the designation of the characters which are to be utilized in a test of the deflection circuitry. The source 38 provides reference signals, R, which are equal in value to the amplitudes of the X and the Y signals on lines 42 and 44 at the midpoint of the test character being applied to the CRT 36. The Z axis signal from the gate 56 blanks the CRT 36 so that the test character, such as a vector directed generally radially outward on the face of the CRT 36, is not seen on the face of the CRT 36. Thus, at the beginning of the generation of the test character, the detection circuit 40 detects values of X and Y on lines 42 and 44 which, assuming minimal drift of these values, are less than the corresponding reference signals R of the source 38. Subsequently during the generation of the test character, assuming the aforementioned minimal drift, the amplitudes of the X and Y signals on the lines 42 and 44 become greater than the corresponding values of the reference signals R. Thus, the amplitudes of the signals on lines 42 and 44 are seen to cross over the corresponding amplitudes of the reference signals of the source 38 during the generation of the test character. The detection circuit 40, by detecting the initial and final comparisons between the signals on the lines 42 and 44 and their corresponding reference signals, senses the occurrence of the aforementioned cross over. The detection circuit 40, as will be seen subsequently with reference to FIG. 2, includes comparators utilizing the reference signals R as a threshold for determining the occurrence of the crossing of the threshold.

In the event that, subsequent to the alignment, excessive drifting has occurred in the deflection circuitry, such as in the corrector 34 or in the converters 23-24, no cross-over is sensed by the detection circuit 40 since the initial and final values of the test character are either both in excess of the threshold or less than the threshold. The sensing of the threshold crossing is transmitted from the circuit 40 to the register 60 which serves as a buffer storage whereby the information stored in the register 60 is displayed on the indicator 62. Thereby, the indicator 62 displays a success or failure of the performance monitoring test. The information stored in the register 60 is also applied to the computer 22 for use in the aforementioned program of halving the uncertainty region for measuring the coordinate signals.

Figure 2:
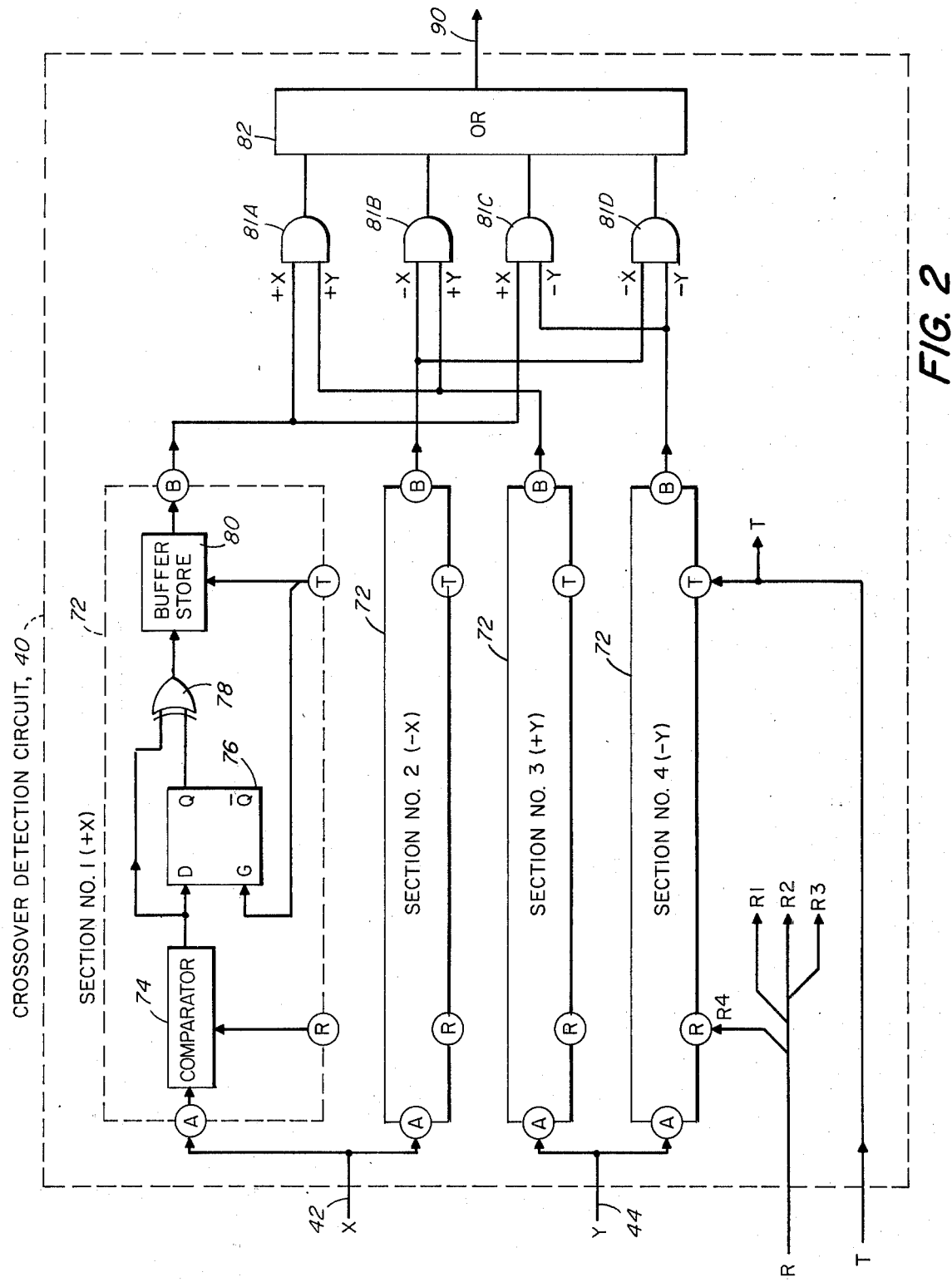
FIG. 2 is a schematic diagram of a detection circuit of FIG. 1 used for comparing deflection signals with reference signals from a reference source of FIG. 1.
Figure 3:
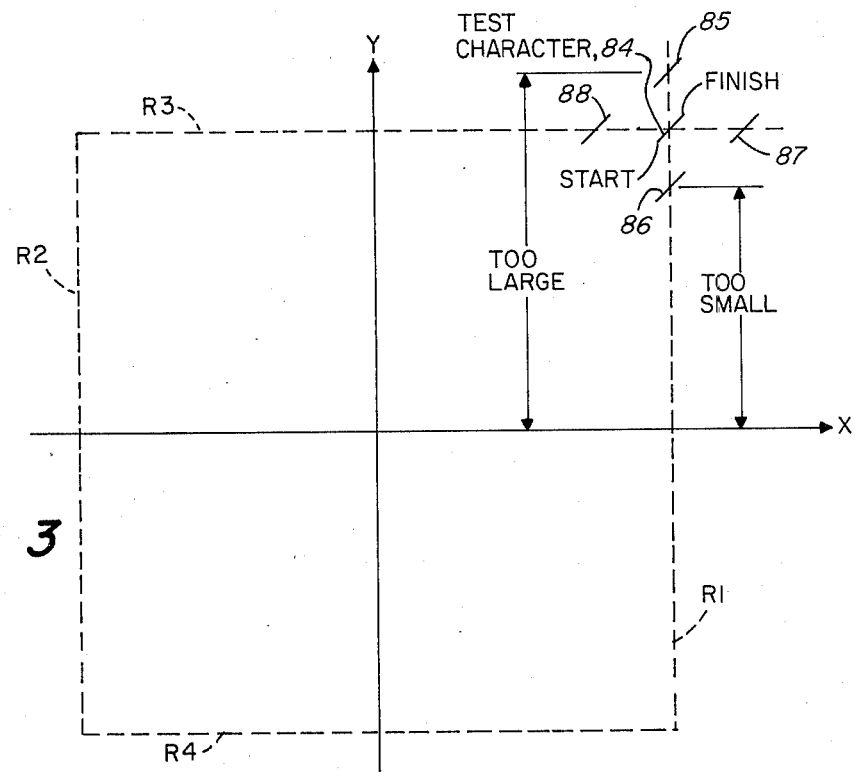
FIG. 3 is a diagram useful in explaining the relationships of the deflection signal magnitudes to the reference signals utilized in the initial alignment of the display of FIG. 1.

Referring also to FIGS. 2 and 3, the crossover detection circuit 40 is seen to comprise a set of four sections 72 each of which comprises a comparator 74, a type "D" flip-flop 76, an exclusive OR gate 78, and a storage unit 80. Output signals from terminal B from each of the sections 72 are coupled via a set of AND gates 81 to an OR circuit 82. Individual ones of the AND gates 81 are further identified by the legends A-D to facilitate reference to a specific one of the gates 81 such as the gate 81A which combines +X and +Y signals of the first and the third of the sections 72. The input terminals, designated by the letter A, of the first and the second of the sections 72 are each coupled to line 42 for sensing the value of the X deflection signal. Similarly, the input terminals of the third and the fourth of the section 72 are each coupled to the Y deflection signal on line 44. The reference signals R, from the source 38 of FIG. 1, are seen to fan out with one signal being applied to each of the corresponding reference terminals, labeled R, in the corresponding sections 72. Thus, the legend R1 in FIG. 2 identifies the reference terminal of the first section 72 while the legends R2, R3 and R4 refer to the corresponding terminals of the second, third and fourth of the sections 72. Timing signals, identified by the legend T, are coupled from terminal C of FIG. 1 to the detection circuit 40 wherein the timing signals are seen to be coupled to each of the terminals, identified by the legend T, and each of the sections 72. The reference signal R1 applied to the first section 72 serves as the threshold for the comparator 74 and has a value equal to the X coordinate of the test character for positive values of X as shown in the graph of FIG. 3. Similarly, the reference signal R2 serves as the threshold for the second of the sections 72 and is equal to the X coordinate value of the test character for negative values of X as shown in FIG. 3. Similar comments apply to the reference signals R3 and R4 for positive and negative values of coordinate signals on the Y axis. The values of the reference signals R1-R4 correspond, assuming no drift or misalignment, to the midpoints of the respective test characters.

By way of example, four locations of test characters are shown in FIG. 3 at the corners of a rectangle bounded by the lines $X=R1$, $X=R2$, $Y=R3$ and $Y=R4$. This is a sufficient number of locations for the test characters to determine whether the alignment procedure, involving a test pattern of typically 20 points, is accurate, and to determine the presence of drift in the deflection signals. It is noted that in the measurement of the amplitude of a coordinate signal, as in a test of the equality $Y=R3$ where Y is the deflection voltage, the measurement need be performed at a specific value of X since the corrector 34 adjusts the value of Y for different values of X in the compensation for nonlinearities of the CRT 36. Similarly, a test of an X coordinate must be made at a specific value of Y. As a result, the alignment and drift tests are to be performed with pairs of coordinate signals, each pair having an X coordinate value and a Y coordinate value. The pairing of tests of coordinate signals is accomplished, as seen in FIG. 2, by the coupling of pairs of the sections 72 to each of the gates 81. Thus, the output signal of the gate 81A represents a test result at a single point, namely, the upper right corner of the rectangle of FIG. 3. Similarly, the gates 81B-D relate respectively to the upper left, the lower right and the lower left corners of the rectangle.

One exemplary test character 84 is shown being utilized, in FIG. 3, for testing the pair of signals +X and +Y at the location of the upper right corner of the rectangle. The R1 and R3 reference signals serve as the threshholds against which the X and Y coordinates, respectively, are to be compared. The marks 85, 86, 87 and 88 represent possible locations of the character 84 when it has drifted, respectively, upward, downward, to the right, and to the left. Thus, with reference to the mark 85, the detection circuit 40 senses that the Y voltage is too large, while, with reference to the mark 86, the detection circuit 40 senses that the Y voltage is too small. Similar comments apply to the sensing of the X voltage component of the marks 87 and 88.

In operation, a section 72 provides a logic level of 1 at terminal B when the signal at terminal A is seen to cross over the threshhold provided by the reference signal at terminal R. The comparator 74 produces a logic one when the signal at terminal A is equal to or exceeds the threshhold, the logic one signal being applied to the D terminal of the flip-flop 76 and to an input terminal of the gate 78. As is well known in the operation of type D flip-flops, the logic level of the signal at the input terminal D is transferred to the output terminal Q upon application of a gating signal at terminal G. In the absence of the gate signal, the logic level at terminal Q is retained independently of the value of the signal at terminal D. The clock 58 of FIG. 1 provides for the transmission of a gate signal to terminal T at the start of the generation of the test character with the result that the logic level resulting from the comparison by the comparator 74 is transmitted from terminal D via the flip-flop 76 to terminal Q to appear at one input terminal of the gate 78 while, at the other input terminal of the gate 78, the logic level is transmitted directly from the comparator 74. Thereby, at the start of the generation of the test character, the same logic level appears at both input terminals of the gate 78 with the result that a logic level of zero is applied by the gate 78 to the storage unit 80. Thereupon, the gating signal at terminal G is terminated for the remainder of the generation of the test character. Accordingly, the logic level at terminal Q remains unchanged during the remainder of the generation of the test character. In the event that the threshhold is crossed, the logic level produced by the comparator 74 is inverted with the result that the signal appearing at one input terminal of the gate 78 is inverted relative to the signal appearing at the other input terminal of the gate 78. Thereupon, the gate 78 applies a logic 1 signal to the storage unit 80 indicating that the threshold has been crossed.

For example, in the event that the test character 84 has a starting coordinate in X which exceeds R1, it is seen that the logic level produced by the comparator 74 is a logic 1 throughout the generation of the character 84 with the result that equal signals are applied to both input terminals of the gate 78 throughout the generation of the test character. Accordingly, a logic zero is applied to the storage unit 80. In the event that the value of the X coordinate of the character 84 is so small that the finish point is less than R1, then the signal at terminal A of the first section 72 is less than the value of the reference signal at terminal R so that the comparator 74 produces a signal having a logic zero throughout the generation of the test character 84. Again, the input terminals of the gate 78 each have equal values of signal with the result that a logic zero is applied to the storage unit 80. Thus, it is seen that a logic 1 signal is applied to the storage unit 80 only when the value of the X coordinate falls within a range equal to the height of the character 84 in the X direction. Similar comments apply to the operation of the third section 72 for the Y component of the character 84 as well as to the operation of the second and fourth sections 72 for a test character in the third quadrant of FIG. 3 having components of −X and −Y. By programming the computer 22 to call for a small value of test character, a highly precise measurement of performance is obtained. A strobing signal applied to the storage unit 80 from terminal T provides for the storing of the signal of the gate 78 and the application of that signal via the AND gates 81, the OR circuit 82 and line 90 to the register 60 of FIG. 1. Since an AND gate 81 will produce a logic 1 at its output terminal only when both of its input terminals receive signals of logic 1, it is seen that a signal from terminal B of a section 72, indicating a correct value of coordinate voltage, will appear on line 90 only when the signal of terminal B of another section 72 is also indicating a correct value of coordinate voltage. For example, with reference to the character 84 and the gate 81A, the first and third of the sections 72 must indicate that the X coordinate and the Y coordinate, respectively are correct in order that the signal appear on line 90 indicating a correct location for the character 84.

With respect to the aforementioned measurement of the coordinate voltages at the time of alignment by the procedure of halving the uncertainty region, the sections 72 provide an indication of whether coordinate signals are greater than their corresponding reference signals. The procedure is initiated by the computer 22 by the generation of a relatively large test character and, thereafter, the computer 22 gradually reduces one dimension (X or Y) of the character. When individual points of that dimension exceed, or fail to exceed, the corresponding reference signal, the corresponding section 72 applies respectively a logic 1 or a logic 0 to the register 60 of FIG. 1. Thereupon, the register 60 transmits the signal of the section 72 to the computer 22. The computer 22 then halves the dimension and adjusts the coordinate voltage accordingly, the procedure continuing until a relatively small dimension is applied to the test character. If desired, the test character may consist of only two points with the spacing between the points along a specific dimension (X or Y) designating the accuracy of the measurement.

Figure 4:
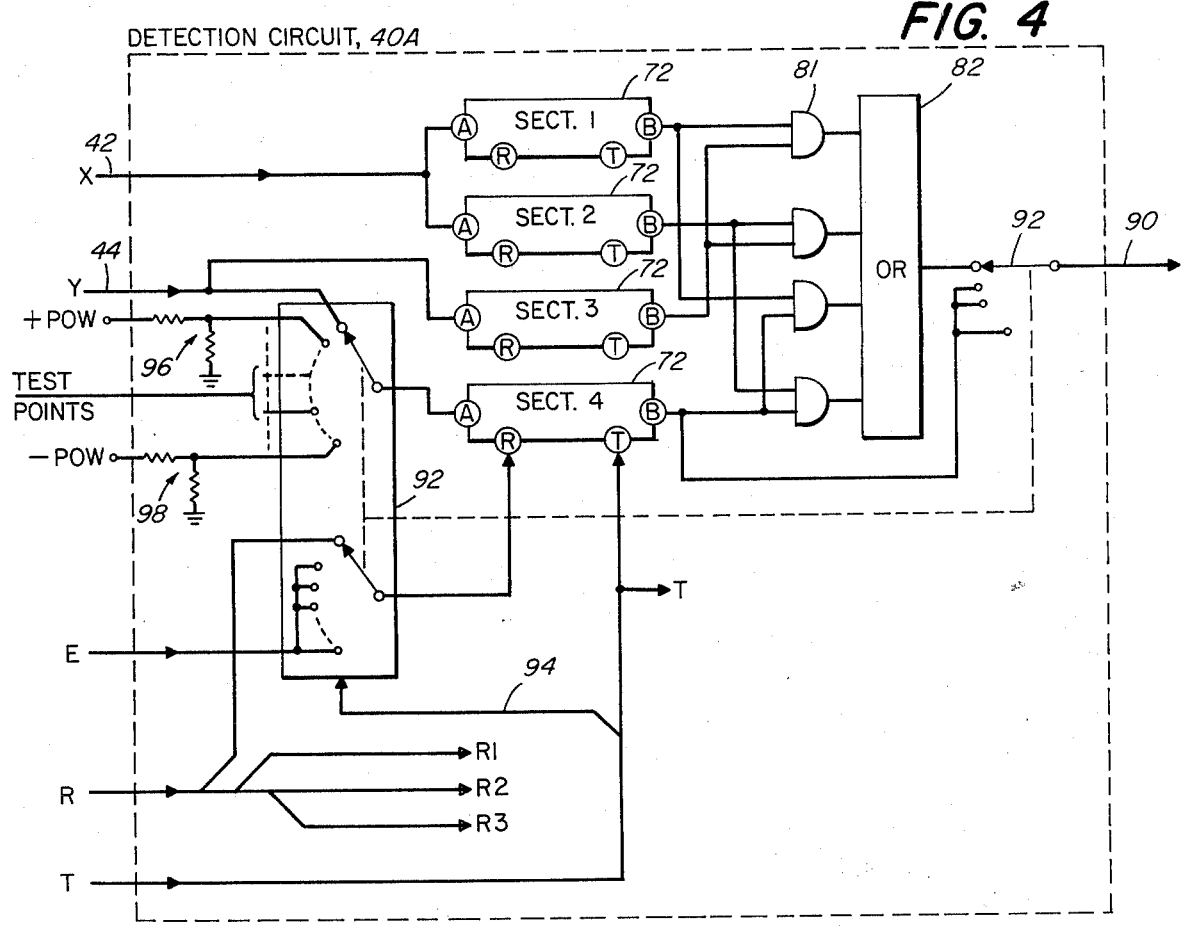
FIG. 4 is a block diagram of an alternative embodiment of the detection circuit of FIG. 2, the alternative embodiment of FIG. 4 including switching circuitry for connecting test points of the display to the detection circuit for monitoring voltages of the test points.

Referring now to FIG. 4, there is seen an alternative embodiment of the detection circuit of FIG. 2, the detection circuit of FIG. 4 being identified by the legend 40A. The detection circuit 40A comprises the sections 72, the gates 81, and the OR circuit 82 of FIG. 2, and further comprises a switch 92 for selectively coupling any one of several input signals to the input terminal A of the fourth section 72. While the switch 92 is shown schematically as a mechanical switch, it is understood that an electronic switch such as an FET (field effect transistor) multiplexing switch for analog signals may be employed. With the switch contactor in the position as shown in FIG. 4, the electrical connections between the X and Y signals of lines 42 and 44 to the input terminals of the four sections 72 is the same as that seen in FIG. 2. The switch 92 is operated by timing signals on line 94 seen fanning out from the timing signals at terminal T. The switch 92 shows connections to positive and negative values of the power supply voltage as well as to other test points of the display 20 for monitoring signals of other components of the display 20 to verify their proper operation. The fourth of the sections 72 is utilized for testing these other circuits. A portion of the switch 92 bypasses the gates 81 and the OR circuit 82 to couple terminal B of the fourth section 72 directly to line 90. In lieu of the reference signal from the source 38 of FIG. 1, the switch 92 couples reference signals from terminal E to the reference input terminal of the fourth section 72. As seen in FIG. 1, terminal E is the output terminal of the converter 24. The computer 22, in accordance with the program stored in the memory 64, provides specific values of signals to the converter 24 to serve as threshholds against which the signals of the test points are compared by the fourth section 72 of the detection circuit 40A. The signals of the power supplies are first attenuated by resistive attenuators 96 and 98 before being applied to the comparator of the fourth section 72 in order to reduce the magnitude of the power supply voltages to levels which can be duplicated by the converter 24.

An interesting feature of the monitoring procedure is the ability to locate a fault to one of the components of the display 20 in the event that the indicator 62 shows that the performance is not adequate. Thus, a test procedure is instituted to determine whether the fault is in the converters 23-24 or in the character generator 26. By reducing the size of the test character, the indicator 62 is seen to show good performance in the event that the amplitude of the signal of the generator 26 is drifting. Should the indicator 62 continue to show a fault when the test character has been reduced to a small value, then the fault is understood to be in the converters 23-24 or in the corrector 34. Thereby, the system of FIG. 1 is able to both monitor the performance as well as aid in the location of the fault without interrupting the display of data on the CRT 36.

It is understood that the above-described embodiments of invention are illustrative only and that modifications thereof may occur to those skilled in the art. Accordingly, it is desired that this invention is not to be limited to the embodiments disclosed herein but is to be limited only as defined by the appended claims.

What is claimed is:

1. A computer driven system having a performance monitoring circuit comprising:

means for generating random coordinate position signals;

a source of reference signals;

means for comparing a predetermined set of said coordinate position signals with said reference signals during a first and second interval of time, said comparing means sensing the relative magnitudes of said coordinate position signals and said reference signals; and means for detecting drift greater than a predetermined amount in said predetermined set of coordinate position signals as a function of a change in the relative magnitudes from a comparison made in said first interval to a comparison made in said second interval.

2. In a computer driven system for generating coordinate position signals, a monitoring circuit comprising:

a source of reference signals;

means for comparing said coordinate position signals with said reference signals during a first and a second interval of time, said comparing means sensing the relative magnitudes of said coordinate position signals and said reference signals, said comparing means including means for signaling a change in the relative magnitudes from a comparison made in said first interval to a comparison made in said second interval; and said comparing means further comprising means responsive to said computer for designating a test character positioned in accordance with said coordinate position signals, said test character designating means varying the magnitudes of said coordinate position signals during said comparison to permit an equality between one of said coordinate position signals and a corresponding one of said reference signals when said coordinate position signals are within a predetermined range of values from said reference signals.

3. A system according to claim 2 wherein said system includes a display with data positioned thereon in accordance with said coordinate position signals, said display including means coupled to said computer for blanking said test character.

4. A performance monitoring system comprising:

means for generating plural axes random positioning signals;

means for storing a predetermined set of said positioning signals;

means for generating a plural axes test signal;

means for combining said test signal with said set of positioning signals to provide a set of combined signals;

means for comparing said combined signals with a set of reference signals; and means for detecting a difference greater than a predetermined amount between said combined signals and said reference signals as a function of the output of said comparing means.

5. In a system for generating plural axes random positioning signals, a monitoring system comprising:

means for storing a first set of said positioning signals;

means for providing a predetermined set of reference signals;

means for generating a plural axes test signal;

means for combining said test signal with said set of positioning signals to provide a set of combined signals, said combined signals having a varying amplitude in each axis for bounding the amplitude of said reference signals;

means for comparing said combined signals with a set of reference signals; and means responsive to said comparing means for providing a second set of positioning signals within a predetermined range of said reference signals and for storing said second set of positioning signals in place of said first set.

6. A system according to claim 4 further comprising means for triggering said comparing means to produce successive comparisons of said combined signals with said reference signals during spaced apart intervals of time, said combining means utilizing said stored second set of positioning signals in said combined signals during said successive comparisons.

7. A system according to claim 6 further comprising a display, said display including means triggered by said triggering means for blanking said test signal.

8. In combination:

means for generating a sequence of positioning signals in a plurality of axes;

means for varying the amplitudes of said positioning signals to provide signals of varying amplitudes;

a source of reference signals, a variation in the amplitude of said positioning signals providing a range of signal amplitudes which bound in each of said axes the amplitude of said reference signals; and means for comparing said sequence of varying amplitude signals with said reference signals, sequentially during a sequence of intervals; and means for detecting a drift in the amplitude of said positioning signals, said detecting means being connected to the output of said comparing means.

9. A combination according to claim 8 wherein said varying means includes means for generating a signal of varying amplitude, and means for combining said signal of varying amplitude with said sequence of positioning signals.

10. A combination according to claim 9 further comprising a display and means synchronized with said comparing means for blanking the appearance on said display of said signal of varying amplitude.

11. A computer driven system having a performance monitoring circuit comprising:

comparing means having first and second inputs;

means for generating random coordinate position signal coupled to said first input of said comparing means;

means for generating reference signals coupled to said second input of said comparing means; and means for detecting a predetermined difference in amplitude between said first and second input signals of said comparing means as a function of the output of said comparing means.

12. The system of claim 11 further comprising:

means for providing test points for a plurality of signals presenting said system; and means for selectively switching said first input of said comparing means to a predetermined one of said plurality of test points.

13. The system of claim 12 wherein:

said reference signal generating means comprise digital to analog converting means and means for providing to the input of said converting means one from a predetermined set of digital signals.

* * * * *